Patented Nov. 20, 1923.

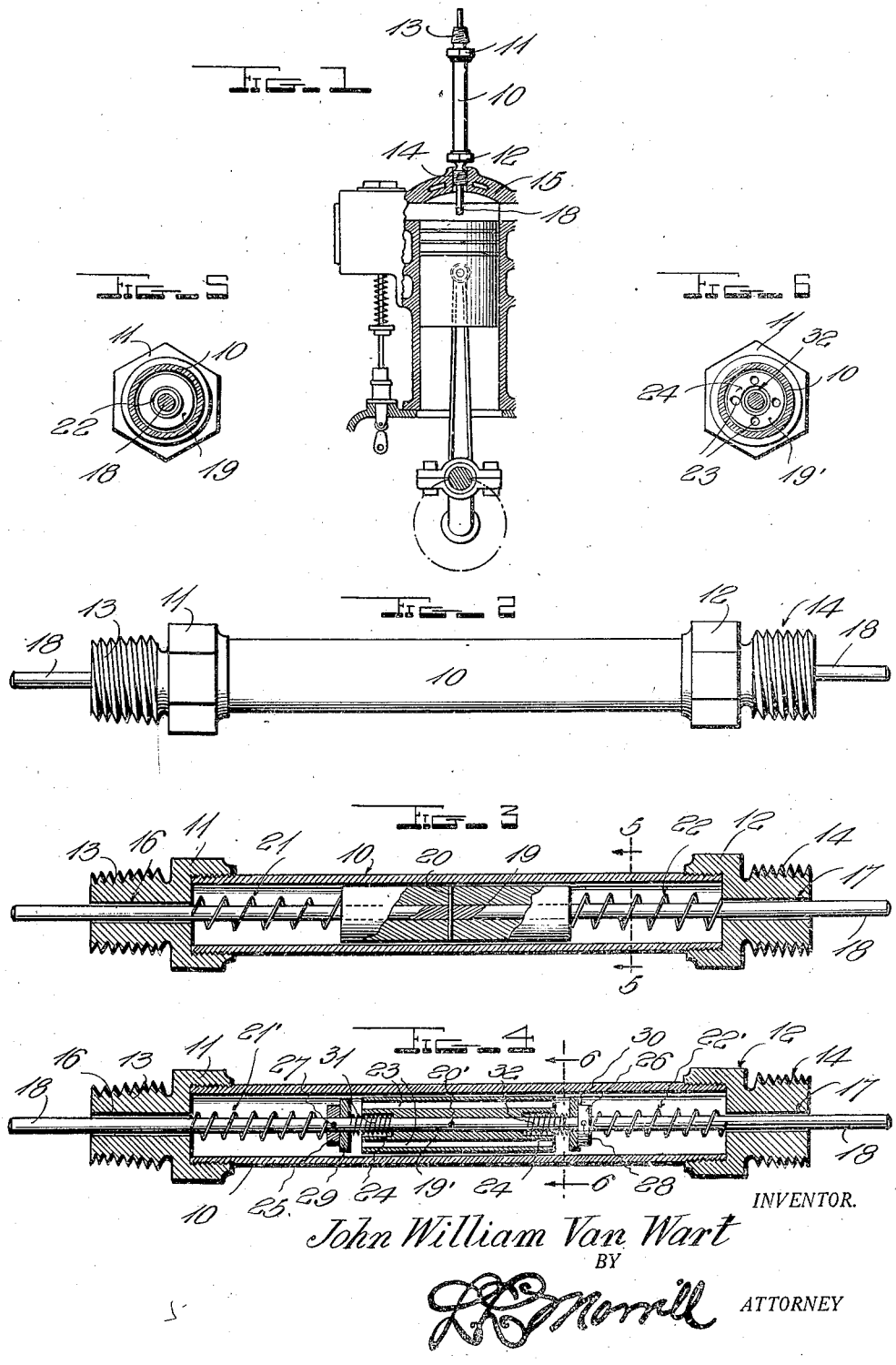

1,475,096

UNITED STATES PATENT OFFICE.

JOHN WILLIAM VAN WART, OF SOUTH NYACK, NEW YORK.

COMPRESSION INDICATOR.

Application filed July 16, 1923. Serial No. 651,996.

*To all whom it may concern:*

Be it known that I, JOHN WILLIAM VAN WART, a citizen of the United States, residing at South Nyack, in the county of Rockland and State of New York, have invented certain new and useful Improvements in Compression Indicators, of which the following is a specification.

This invention relates to compression indicators for internal combustion engines and has for an object to provide a device adapted to be so associated with an internal combustion engine as to indicate the direction of travel of a piston in a cylinder and the limit of travel in any direction.

A further object of the invention is to provide a compression indicator so proportioned as to replace a removed spark plug and in such position to visually indicate the direction of travel of a piston while any piston is being slowly and manually moved in either direction and to further indicate the instant the said piston reaches its limit of travel in said direction.

A further object of the invention is to provide a compression indicator of the general type of a cylinder having a piston therein movable in either direction, provided at its opposite ends with means for association with the cylinder of an internal combustion engine and also open at each end, one of said ends to communicate with the atmosphere and the other with the chamber of the cylinder whereby the movement of the piston in either direction, indicated by the stem of the piston extending through the visible end of said cylinder, shall indicate the direction of travel of the piston and the return of the indicator to normal indicate the limit of travel of the piston of the engine.

With these and other objects in view, the invention comprises certain novel parts, elements, combinations, constructions, interactions, mechanical movements and functions, as disclosed in the drawings together with mechanical and functional equivalents thereof, as will be hereinafter more fully described and claimed.

In the drawings:

Figure 1 is a view of a conventional automobile engine cylinder and piston with the compression indicator associated therewith.

Figure 2 is a view of the compression indicator in side elevation.

Figure 3 is a view of the compression indicator in longitudinal, diametrical section.

Figure 4 is a longitudinal, diametrical sectional view through a different embodiment of the invention.

Figure 5 is a transverse sectional view through the indicator taken on line 5—5 of Figure 3.

Figure 6 is a transverse sectional view through the embodiment of the invention shown at Figure 4.

Like characters of reference indicate corresponding parts throughout the several views.

It is well known that at times it is necessary or highly desirable to determine the direction of travel of the piston of an automobile engine and the limit of travel of said piston, as for instance in adjusting, the timing mechanism of said engine and for such other purposes as may be found necessary or desirable. It is extremely difficult to determine not only the limit of movement of a piston but even the direction of its travel. The present invention is intended to indicate visually not only the direction of travel of the piston of the engine, but by the action of the visible parts of the device to indicate when the piston has reached the limit of its movement in either direction.

Specifically, the invention comprises a cylindrical tube 10 having heads 11 and 12 proportioned to be engaged by a wrench or similar implement, as indicated and with screw-threaded nipples 13 and 14 respectively, which screw-threaded nipples are proportioned to fit the standard threaded bore of internal combustion engines as provided in the present practice for the reception of spark plugs. In practice, therefore, the spark plug will be removed from the internal combustion engine 15, as indicated at Figure 1, and the device as an entirety will be employed to replace said spark plug, either the threaded nipples 13 or 14 being inserted in the threaded opening as the size and thread of the opening shall dictate.

The heads 11 and 12 have axial openings 16 and 17 respectively through which extends a rod or stem 18 smaller in diameter than the openings 16 and 17 to provide an annular passage about said stem at each of said heads 11 and 12 and with the ends of said stem 18 extending beyond the respective heads.

Within the tube 10, a follower 19 is employed similar in most respects to a piston and secured to the stem 18 in any approved manner as by the pin 20.

The follower 19 is shorter than the tube 10 and in the intervals between the opposite ends of said follower and the respective heads 11 and 12 springs 21 and 22 are interposed. The follower 19 is not made completely air tight and the springs 21 and 22 are of smaller diameter and slight resistance, so that, the follower 19 is relatively free to move in either direction as the air pressure within the tube 10 upon either end of the follower 19 shall provide. This pressure within the tube 10 upon the follower 19 may be either atmospheric pressure or super-atmospheric pressure. When employed upon a cylinder as shown at Figure 1, the engine shaft is turned slowly by hand moving the piston of the engine slowly in response to said turning. If the piston be moving on its instroke, the indicator is subject to exhaust within the cylinder of the engine and the follower 19 is, therefore, subject to atmospheric pressure, overbalancing the attenuated tension of the air within the cylinder. When the piston is moving on its outstroke, the compression of the piston is communicated through the openings 16 or 17 against the follower 19 provides superatmospheric pressure whereby the follower responds and such response is indicated by the outward movement of the stem 18. It is obvious, therefore, that as the engine shaft is manually moved the inward or outward movement of the stem 18 will accurately indicate whether or not the piston of the engine is moving on its instroke or its outstroke. When the piston of the engine shall reach the limit of its outstroke, the stem 18 being released from compression will suddenly drop, indicating to a nicety the extreme movement of the piston. For purposes of adjusting the timing mechanism, or burning out carbon from the cylinder, this position must be known to the operator and by the use of this device such position can be quickly and accurately determined.

At Figure 4 is shown an embodiment of the invention differing slightly from the embodiment shown at Figure 3. In this embodiment, the follower 19' is provided with a plurality of longitudinal passages 23. It is also provided in its opposite ends with sockets 24, forming an annular chamber about the stem 18.

Also in this embodiment, the springs 21' and 22' do not engage directly against the ends of the follower but collars 25 and 26 are employed, rigidly secured to the stem in any approved manner as by the pins 27 and 28.

Slidably mounted upon the spindle 18 are washers 29 and 30 with springs 31 and 32 interposed between such washers and the ends of the follower and under compression seated in the sockets 24.

The operation of this embodiment of the invention is that the pressure within the tube, either atmospheric or super-atmospheric, is supplied first against the washer 29 or 30, overcoming first the tension of the spring 31 or 32 to force this washer against the respective end of the follower to cover the longitudinal passages 23. In this condition, the follower operates exactly as described in regard to the embodiment shown at Figure 3, but, when the pressure is relieved, the spring 31 or 32 instantly disengages the washer 29 or 30 and, therefore, releases instantly the pressure upon the follower whereby the device acts even more quickly than the embodiment shown at Figure 3.

The internal combustion engine shown at Figure 1 in the drawings is, of course, a conventional automobile engine and the present invention will find its greatest use and utility in association with automobile internal combustion engines, although it is to be understood that the invention is in no way limited to internal combustion engines associated with automotive vehicles.

What I claim to be new and desire to secure by Letters Patent of the United States is:

1. A compression indicator comprising a tube, a follower mounted to slide in either direction in the tube and permit the passage of air thereabout, springs positioned to maintain the follower normally midway of said tube, extremities extending beyond the end of the tube and connected with the follower, and means to connect either end of the tube in communication with the cylinder of an internal combustion engine.

2. A compression indicator comprising a tube a follower slidable in the tube proportioned to permit passage of air thereabout, heads closing the ends of the tube and provided with axial perforations, a stem extending axially through the tube and through the perforations and rigidly connected with the follower, springs interposed between opposite ends of the follower and the respective heads, and means carried by the heads for connection and communication with cylinders of internal combustion engines.

3. A compression indicator comprising a tube, heads for the opposite ends of the tube provided with axial perforations and differentiated threaded nipples, a follower slidably located within the tube proportioned to permit the passage of air thereabout, a stem extending through the tube and the axial perforations and beyond each of the heads, a follower rigidly secured to the middle of said stem and slidable in the tube, and springs interposed between opposite ends of the follower and heads, tending to hold said follower normally yieldingly midway the tube.

4. A compression indicator comprising a tube, a follower mounted to slide in either direction in the tube, springs positioned to maintain the follower normally midway of said tube, extremities extending beyond the ends of the tube and connected with the follower, means to connect either end of the tube in communication with the cylinder of an internal combustion engine, and a valve carried by the follower adapted to relieve pressure upon the follower.

5. A compression indicator comprising a tube, a follower slidable in the tube, heads closing the ends of the tube and provided with axial perforations, a stem extending axially through the tube and through the perforations and rigidly connected with the follower, springs interposed between opposite ends of the follower and the respective heads, means carried by the heads for connection and communication with cylinders of internal combustion engines, and a valve carried by the follower adapted to relieve pressure upon the follower.

6. A compression indicator comprising a tube, heads for the opposite ends of the tube provided with axial perforations and differentiated threaded nipples, a follower slidably located within the tube, a stem extending through the tube and the axial perforations and beyond each of the heads, a follower rigidly secured to the middle of said stem and slidable in the tube, springs interposed between opposite ends of the follower and heads, tending to hold said follower normally yieldingly midway the tube, and a valve carried by the follower adapted to relieve pressure upon the follower.

In testimony whereof I affix my signature.

JOHN WILLIAM VAN WART.